UNITED STATES PATENT OFFICE.

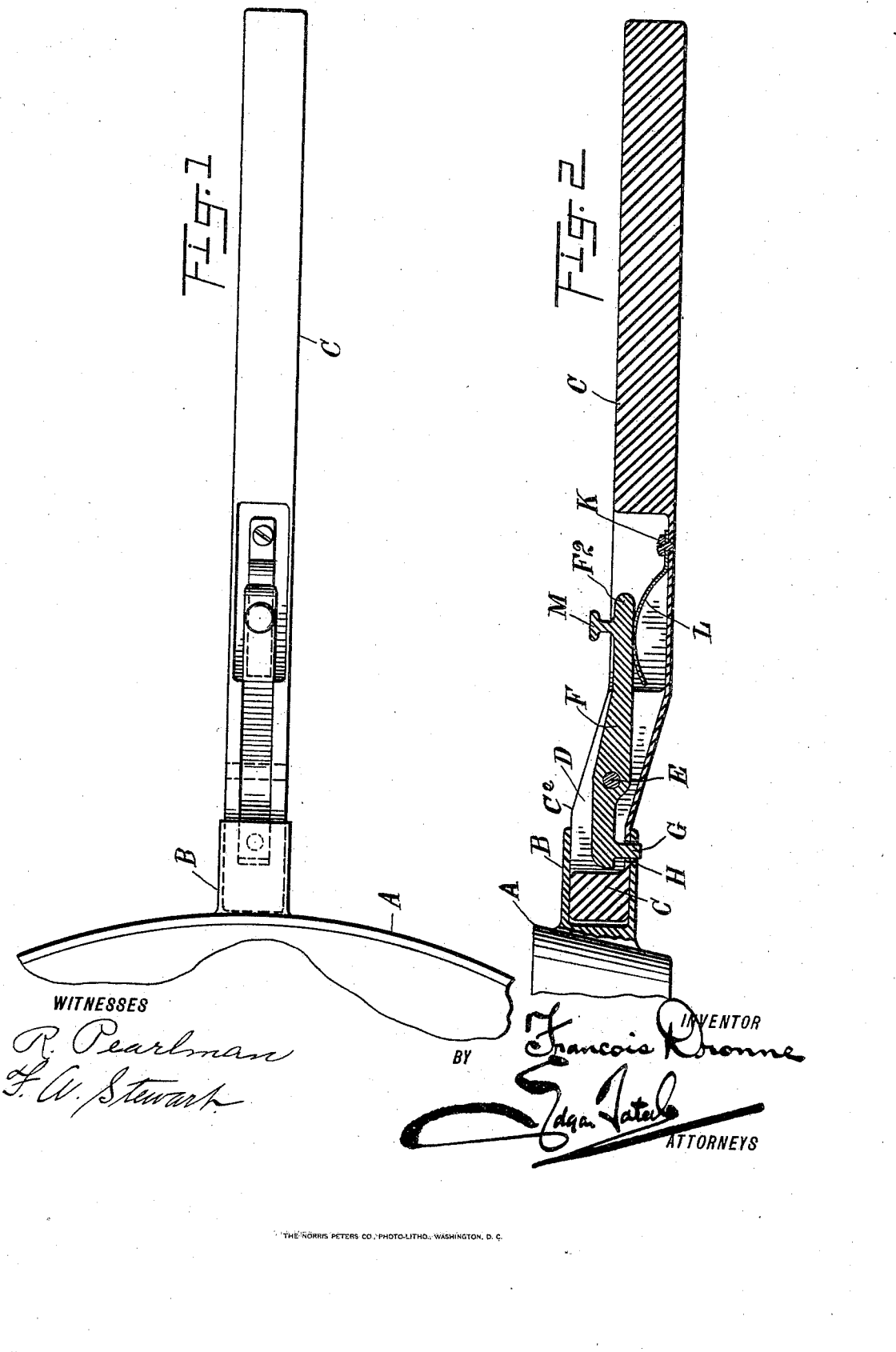

FRANCOIS DRONNE, OF ANNADALE, NEW YORK.

DETACHABLE HANDLE FOR COOKING VESSELS.

SPECIFICATION forming part of Letters Patent No. 691,050, dated January 14, 1902.

Application filed August 24, 1901. Serial No. 73,115. (No model.)

*To all whom it may concern:*

Be it known that I, FRANCOIS DRONNE, a citizen of the United States, residing at Annadale, in the county of Richmond and State of New York, have invented certain new and useful Improvements in Detachable Handles for Cooking Vessels, of which the following is a full and complete specification, such as will enable those skilled in the art to which it appertains to make and use the same.

The object of this invention is to provide an improved detachable handle for pots, bake-pans, and other cooking utensils; and with this object in view the invention consists in a device of the class specified constructed as hereinafter described and claimed.

In the drawings forming part of this specification, in which the separate parts of my improvement are designated by the same reference characters in each of the views, Figure 1 is a plan view of a device, showing my improvement and the method of operating the same; and Fig. 2 is a longitudinal side section thereof.

In the drawings forming part of this specification I have shown at A a part of the bake-pan, and this pan is provided at one side with a socket B, which may be formed integrally therewith or may be attached thereto, and in the practice of my invention I provide a handle C, one end of which, when the handle is held in position for use, is higher than the other, as shown in $C^2$, and this handle is provided in the upper side thereof adjacent to the raised portion and formed partly in the raised portion with a longitudinal chamber in which is pivoted at E a lever F, which ranges longitudinally of the handle and which is provided at one end with a finger G, adapted to pass through suitable holes H, formed in the bottom of the socket B and in the bottom of the chamber D, and secured in the bottom of the chamber D in the end opposite the holes H, as shown at K, is a spring L, which bears on the bottom of the end of the lever F, and said lever is preferably provided with a thumb or finger device M, by means of which the end $F^2$ of said lever is depressed against the operation of the spring L.

The operation of this device will be readily understood when taken in connection with the accompanying drawings and the following statement thereof. If the handle is in position for use, as shown in the drawings, in order to detach the handle all that is necessary is to depress the outer end $F^2$ of the lever F, which operation draws the finger G out of the holes H and the handle C may be removed from the socket B, and by reversing this operation the handle C may be secured in the socket D, as will be readily understood, and the pot, pan, and other vessels may be manipulated thereby in the usual manner.

By means of this construction I provide a handle for cooking utensils or vessels which may be readily attached thereto and detached therefrom whenever necessary, and I thus prevent the heating of the handle and the burning of the hand of the operator, and this handle may be applied to skillets, kettles, frying-pans, and all other cooking utensils of this class.

Having thus fully described my invention, what I claim as new, and desire to secure by Letters Patent, is—

A cooking vessel provided at one side with a horizontal radial socket which opens outwardly and a detachable handle adapted at one end to enter said socket and provided adjacent to said end with a longitudinal chamber, a lever pivoted in said chamber and ranging longitudinally thereof, the end of said lever adjacent to the end of the handle which is adapted to enter said socket being provided with a downwardly-directed projection adapted to pass through holes in the bottom of said chamber and in the bottom of said socket and the opposite end of said lever being spring-supported, substantially as shown and described.

In testimony that I claim the foregoing as my invention I have signed my name, in presence of the subscribing witnesses, this 23d day of August, 1901.

FRANCOIS DRONNE.

Witnesses:
F. A. STEWART,
R. PEARLMAN.